(12) United States Patent
Chen

(10) Patent No.: US 7,823,851 B2
(45) Date of Patent: Nov. 2, 2010

(54) HOOK DEVICE HAVING FOLDABLE STRUCTURE

(75) Inventor: Guanjen Chen, Changhua Hsien (TW)

(73) Assignee: Meng Feng Huang, Yupu Tsuen Hsiensi Hsiang, Changhua Hsien (TW)

( * ) Notice: Subject to any disclaimer, the term of this patent is extended or adjusted under 35 U.S.C. 154(b) by 204 days.

(21) Appl. No.: 12/156,018

(22) Filed: May 29, 2008

(65) Prior Publication Data
US 2009/0224123 A1 Sep. 10, 2009

(30) Foreign Application Priority Data
Mar. 7, 2008 (TW) .............................. 97108262 A

(51) Int. Cl.
*A47F 5/00* (2006.01)
(52) U.S. Cl. ....................................... 248/301
(58) Field of Classification Search .............. 248/466, 248/467, 322, 329, 339, 304, 225.21, 308; 40/638, 310
See application file for complete search history.

(56) References Cited

U.S. PATENT DOCUMENTS

| | | | |
|---|---|---|---|
| 2,846,134 A * | 8/1958 | Moubayed | 229/117.26 |
| 3,070,235 A | 12/1962 | Manzardo | |
| 3,884,443 A * | 5/1975 | McMaster | 248/467 |
| 4,334,620 A | 6/1982 | Block | 211/13 |
| 4,483,502 A * | 11/1984 | Fast | 248/223.41 |
| 4,863,128 A * | 9/1989 | Good | 248/205.3 |
| 4,911,392 A * | 3/1990 | Fast | 248/220.31 |
| 4,997,149 A * | 3/1991 | Koch | 248/100 |
| 5,405,022 A * | 4/1995 | Rissley | 211/59.1 |
| 6,641,910 B1 * | 11/2003 | Bries et al. | 428/343 |
| 6,966,446 B1 * | 11/2005 | Wise et al. | 211/113 |
| 7,296,772 B2 * | 11/2007 | Wang | 248/309.1 |

* cited by examiner

Primary Examiner—Terrell Mckinnon
Assistant Examiner—Erin Smith
(74) Attorney, Agent, or Firm—Charles E. Baxley

(57) ABSTRACT

A planar member for forming a hook device includes two side hinge lines and an intermediate hinge line formed in the planar member for forming two side segments and two intermediate segments, and a cut line formed in each of the intermediate segments for separating each intermediate segment into a support portion and a suspension portion, the suspension portions of the intermediate segments are foldable relative to each other and inclined relative to each other and foldable relative to the side segments for forming a three-dimensional suspension hook, the planar member is foldable to a reel for storing and transportation purposes and is quickly folded into the hook device.

5 Claims, 4 Drawing Sheets

HOOK DEVICE HAVING FOLDABLE STRUCTURE

BACKGROUND OF THE INVENTION

1. Field of the Invention

The present invention relates to a hook device, and more particularly to a hook device including a foldable structure folded from a planar or sheet member for allowing the planar member to be easily stored for transportation purposes and for allowing the planar member to be easily and quickly expanded or opened or folded into the hook device.

2. Description of the Prior Art

Typical hook devices comprise a support or suspension element, and a suspension hook arranged below a label-holder, and a clamping hook serving as a carrier member for hanging onto various supports or suspension facilities.

For example, U.S. Pat. No. 3,070,235 to Manzardo discloses one of the typical key filing systems comprising a number of suspension elements slidably attached onto track slots and each including a suspension hook attached to or extended from the suspension elements for hooking or supporting various objects, such as keys.

However, the suspension hooks are normally solidly extended from the suspension elements and formed integral with the suspension elements such that the suspension hooks and the suspension elements may occupy a great volume that is adverse for storing and transportation purposes.

U.S. Pat. No. 4,334,620 to Block discloses another typical key storage rack comprising a number of suspension hook elements solidly attached onto or extended from the suspension element, such as the relatively thin, elongated strip of a rigid, but deformable material for hanging or hooking or supporting various objects, such as keys.

However, similarly, the suspension hook elements are also solidly extended from the suspension element and formed integral with the suspension element such that the suspension hooks and the suspension element also may occupy a great volume that is adverse for storing and transportation purposes.

The present invention has arisen to mitigate and/or obviate the afore-described disadvantages of the conventional hook devices or key storage racks.

SUMMARY OF THE INVENTION

The primary objective of the present invention is to provide a hook device including a foldable structure folded from a planar or sheet member for allowing the planar member to be easily stored for transportation purposes and for allowing the planar member to be easily and quickly expanded or opened or folded into the hook device.

In accordance with one aspect of the invention, there is provided a planar member for forming a hook device comprising two side hinge lines and an intermediate hinge line formed in the planar member for forming two side segments and two intermediate segments, and a cut line formed in each of the intermediate segments for separating each intermediate segment into a support portion and a suspension portion, the suspension portions of the intermediate segments being foldable relative to each other and inclined relative to each other and foldable relative to the side segments for forming a three-dimensional suspension hook and arranged for allowing the planar member to be easily and quickly expanded or opened or folded into the hook device.

The cut line includes a curved lower portion for forming a curved depression in the suspension hook and for stably hooking or hanging or supporting the objects, and may further include an inclined upper portion for forming a latch member in the suspension hook and for stably anchoring or retaining the objects in engagement with the suspension hook.

The intermediate segments each include a cut slit formed in the support portion for allowing the support portions of the intermediate segments to be folded and intersected and engaged with each other, and/or each include a cut slot formed in the support portion for allowing the support portions of the intermediate segments to be folded and intersected and engaged with each other.

The side segments each include an adhesive layer attached to a back portion for adhering or attaching or securing the hook device onto various supports or suspension facilities. The intermediate segments include an inclined lower portion foldable to form a folded reinforcing member in the suspension hook for reinforcing the suspension hook.

An elongated strip may further be provided for supporting one or more of the planar member and for allowing the planar members and the elongated strip to be folded into a reel which may be easily stored for transportation purposes.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
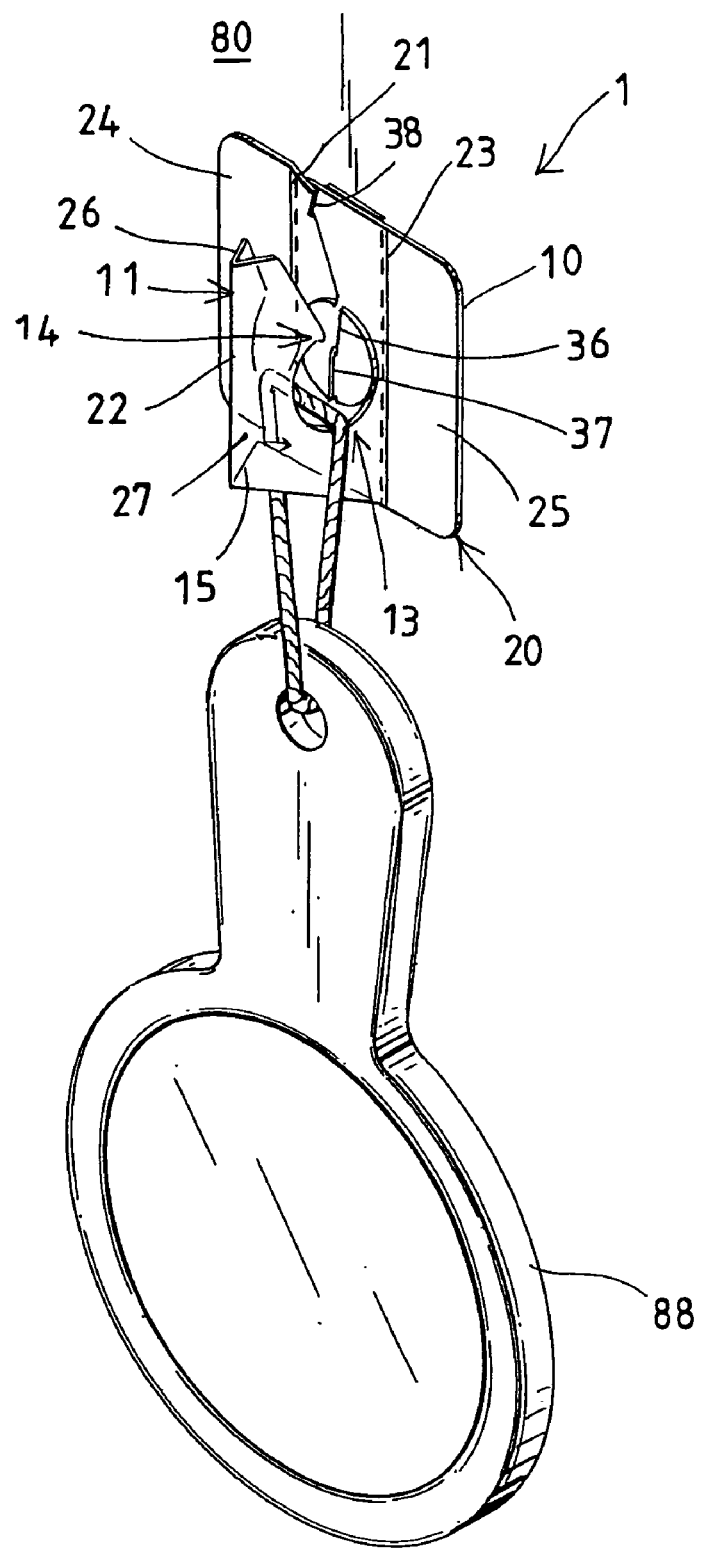
FIG. 1 is a perspective view of a hook device in accordance with the present invention.
Figure 7:
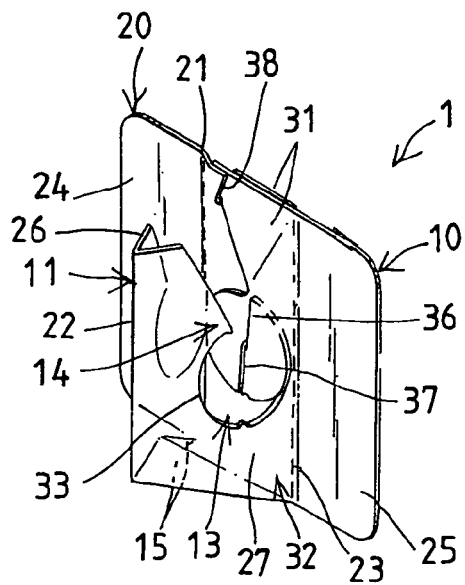

Referring to the drawings, and initially to FIGS. 1 and 7, illustrated is a hook device 1 in accordance with the present invention comprising a support or suspension element 10, and a suspension hook 11 extended from the suspension element 10, and an adhesive member or material or layer 12 (FIG. 3) attached to the rear or back portion of the suspension element 10 for adhering or attaching or securing the hook device 1 onto various supports or suspension facilities 80, such as the walls, the closets, the desks, or the like, and the hook device 1 may thus be arranged for readily attaching or securing to various supports or suspension facilities 80 for hanging or hooking or supporting various objects 88, such as keys or mirrors 88 (FIG. 1).

As shown in FIGS. 2 and 4-7, the hook device 1 is arranged to be folded from a planar or sheet member 20, and a number of planar members 20 may be attached or secured to an elongated strip 50 which may be folded into a reel 5 for allowing the planar members 20 to be easily stored for transportation purposes and for allowing the planar members 20 to be easily and quickly expanded or opened or folded into the hook devices 1. For example, the elongated strip 50 may further include a number of depressions 51 formed in the elongated strip 50 and preferably equally spaced from each other for receiving the planar members 20, and a number of hinge lines or cut lines 52 formed between the depressions 51 and/or the planar members 20 for allowing the planar members 20 to be easily removed or disengaged from the elongated strip 50.

Figure 2:
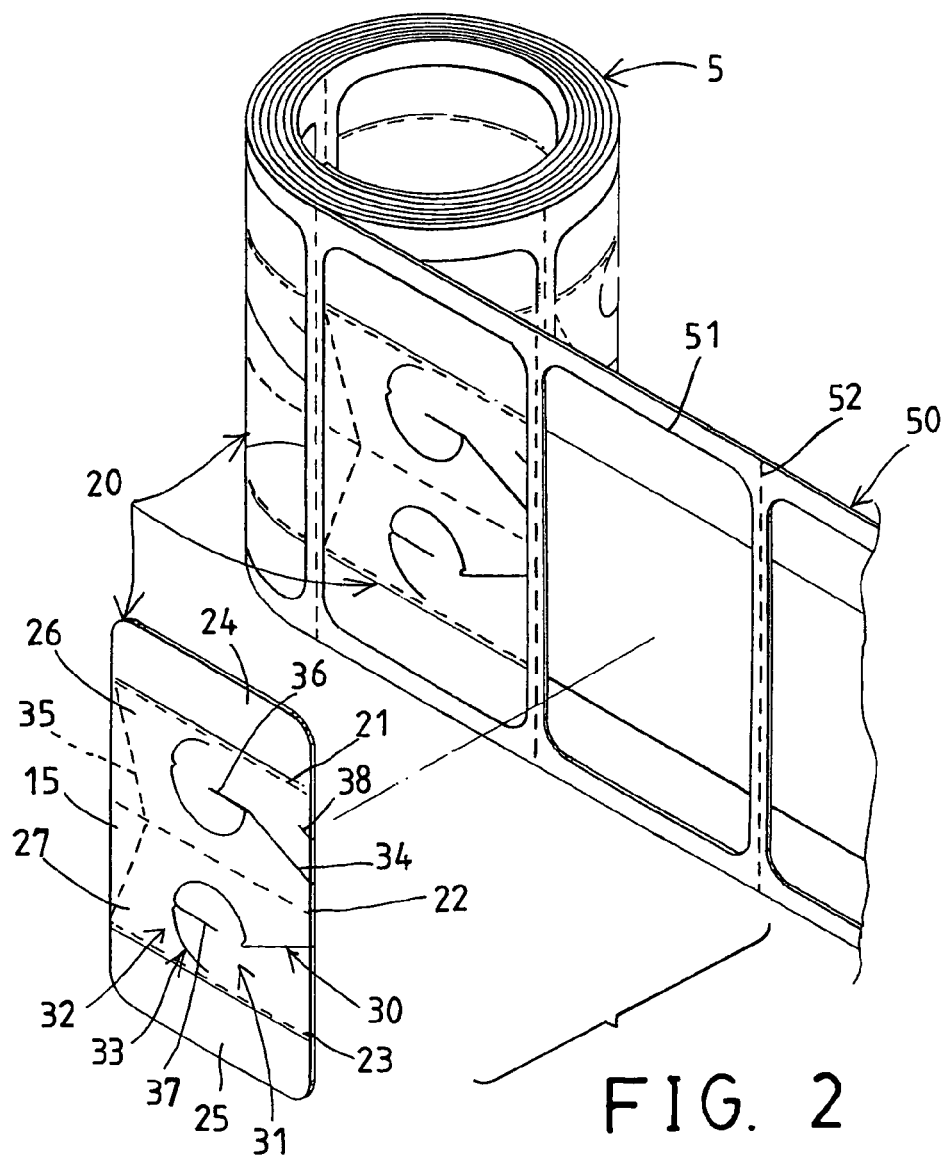
FIG. 2 is a partial exploded view illustrating a reel of a number of planar or sheet members each of which is provided for forming or making a hook device.
Figure 3:
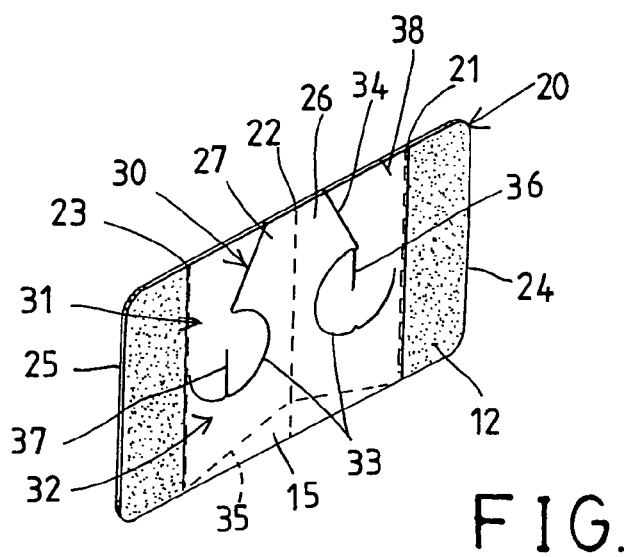
FIG. 3 is a rear perspective view of the planar member for forming or making the hook device.
Figure 4:
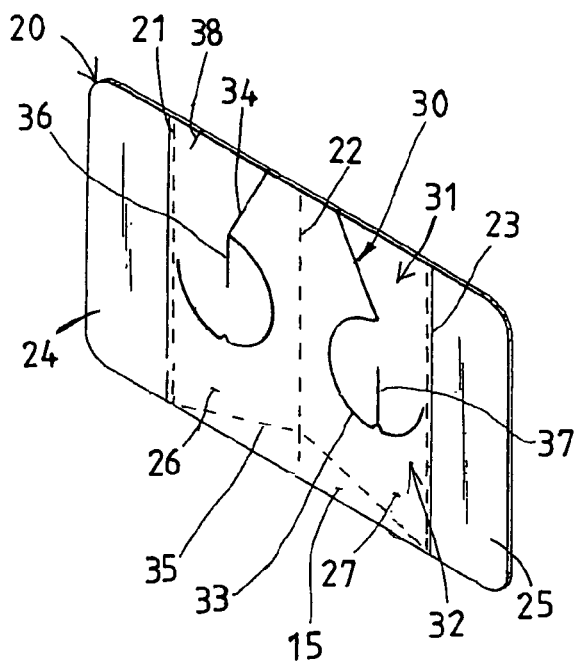
FIG. 4 is a front perspective view of the planar member for forming or making the hook device.
Figure 5:
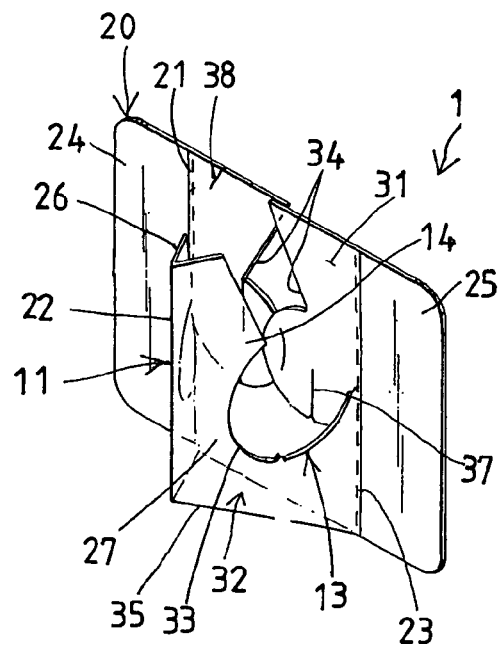
FIGS. 5, 6, 7 are front perspective views similar to FIG. 4, illustrating the folding operation of the planar member into the hook device.

As shown in FIGS. 2-4, the planar member 20 includes three hinge lines or cut lines 21, 22, 23 formed therein and parallel to each other, such as two side hinge lines 21, 23 and an intermediate hinge line 22 for forming four segments 24, 25, 26, 27, such as two side segments 24, 25, and two middle or intermediate segments 26, 27, in which the side hinge lines 21, 23 may be formed and located closer to the two sides or the two ends of the planar member 20 for allowing the two side segments 24, 25 to have a width smaller than that of the two intermediate segments 26, 27, and the intermediate hinge line 22 is equally spaced from the side hinge lines 21, 23 for allowing the two intermediate segments 26, 27 to have an equal width. The intermediate segments 26, 27 of the planar member 20 may be folded relative to each other and tilted or inclined relative to each other and also tilted or inclined relative to the side segments 24, 25 for forming the spatial or three-dimensional suspension hook 11 (FIGS. 1, 7).

A cut line 30 is formed in each of the intermediate segments 26, 27 for separating each intermediate segment 26, 27 into two portions 31, 32, such as a support portion 31 and a suspension portion 32, in which the support portions 31 of the intermediate segments 26, 27 are separated from each other but hinged or linked or coupled to the side segments 24, 25 with the hinge lines 21, 23, and the suspension portions 32 of the intermediate segments 26, 27 are hinged or linked or coupled together and also hinged or linked or coupled to the side segments 24, 25 with the hinge lines 21, 23, and may be folded relative to each other and tilted or inclined relative to each other to form the spatial or three-dimensional suspension hook 11.

Figure 6:
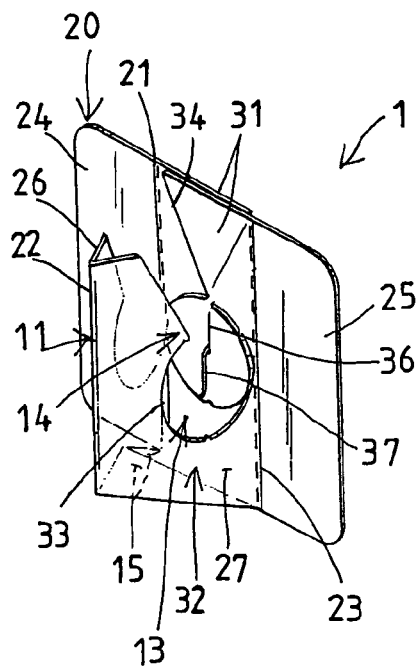

The cut line 30 includes a curved lower portion 33 for forming a curved depression 13 in the suspension hook 11 (FIGS. 1, and 5-7), and for stably hooking or hanging or supporting the objects 88 (FIG. 1), and further includes a tilted or inclined upper portion 34 for forming a latch member 14 in the suspension hook 11 (FIGS. 1, and 5-7), and for stably anchoring or retaining the objects 88 in engagement with the suspension hook 11 (FIG. 1), and further includes a tilted or inclined lower portion 35 for folding and forming a folded reinforcing member 15 in the lower portion of the suspension hook 11 for reinforcing the suspension hook 11, and further includes a cut slit 36, 37 formed in each of the support portions 31, and the cut slit 36, 37 of the support portions 31 are offset or staggered with each other for allowing the support portions 31 of the intermediate segments 26, 27 to be folded and intersected or superposed and engaged with each other (FIGS. 1, 6, 7).

The cut line 30 may further include a tilted or inclined cut slot 38 for allowing the support portions 31 of the intermediate segments 26, 27 to be further folded and intersected or superposed with each other (FIGS. 1, 6, 7) and for allowing the support portions 31 of the intermediate segments 26, 27 to be formed into a superposed and reinforced structure. In operation, as shown in FIG. 2, one of the planar members 20 may be easily and quickly and readily removed or disengaged from the elongated strip 50, and the intermediate segments 26, 27 may then be folded relative to each other and tilted or inclined relative to each other and also folded and tilted or inclined relative to the side segments 24, 25 for forming the spatial or three-dimensional suspension hook 11 (FIGS. 1, 7).

The support portions 31 of the intermediate segments 26, 27 may further be folded and intersected and superposed with each other for forming a reinforced structure, and the suspension portions 32 of the intermediate segments 26, 27 may further be folded to form the folded reinforcing member 15 in the lower portion of the suspension hook 11 for further reinforcing the suspension hook 11, and for increasing the working life of the suspension hook 11. It is to be noted that the planar members 20 may be easily and quickly formed and stored in the elongated strip 50 with a mass production process, and may be folded into the reel 5 for allowing the planar members 20 to be easily stored for transportation purposes.

Figure 8:
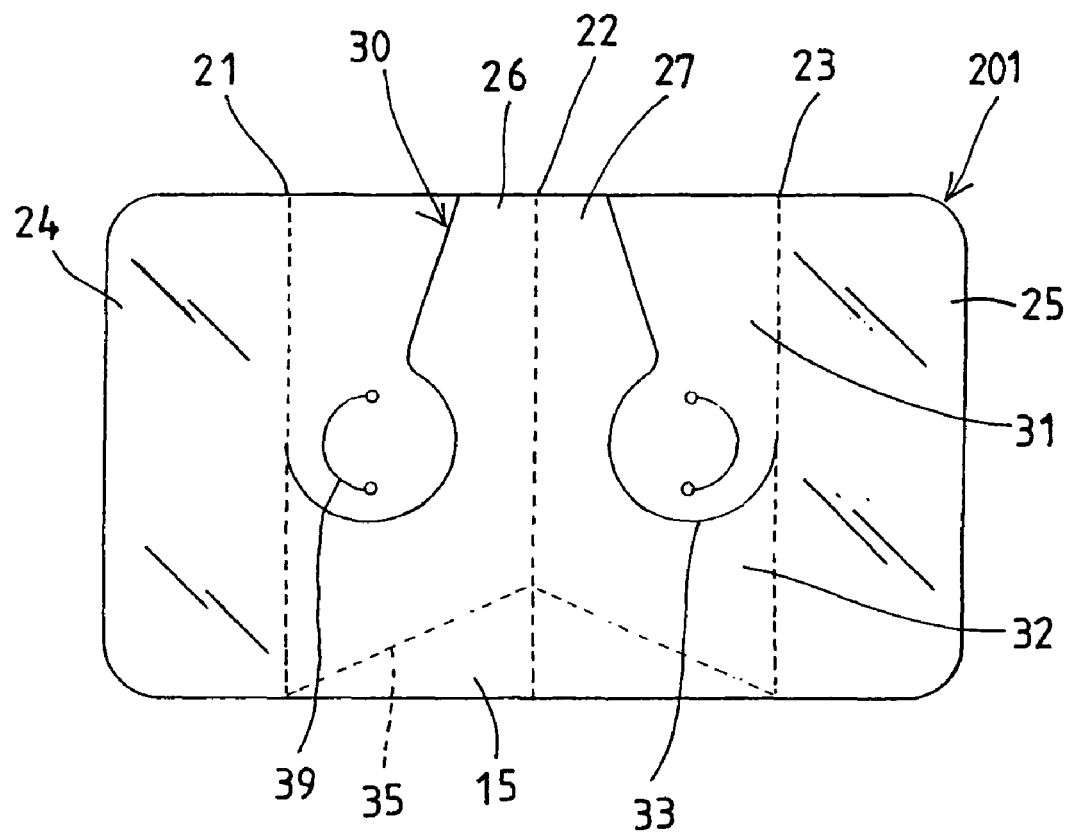
FIG. 8 is a front plan schematic view illustrating the other arrangement of the planar member for forming or making the hook device.

Alternatively, as shown in FIG. 8, the support portions 31 of each planar member 201 each may include a curved cut groove 39 formed therein, instead of the cut slit 36, 37 of the support portions 31 as shown in FIGS. 1-7, and also arranged for allowing the support portions 31 of the intermediate segments 26, 27 to be further folded and intersected and superposed with each other for forming a reinforced structure. The planar members 20, 201 may be made of or selected from the paper boards, the wood materials, the plastic materials, the synthetic materials, the metal materials, and/or the other materials.

Accordingly, the hook device in accordance with the present invention includes a foldable structure folded from a planar or sheet member for allowing the planar member to be easily stored for transportation purposes and for allowing the planar member to be easily and quickly expanded or opened or folded into the hook device, and for allowing the manufacturing cost for the hook device to be greatly reduced.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A planar member for forming a hook device comprising:
   two side hinge lines and an intermediate hinge line formed in said planar member for forming two side segments and two intermediate segments, and
   a cut line formed in each of said intermediate segments for separating each intermediate segment into a support portion and a suspension portion, said suspension portions of said intermediate segments being foldable relative to each other and inclined relative to each other and foldable relative to said side segments for forming a three-dimensional suspension hook, said cut line including a curved lower portion for forming a curved depression in said suspension hook, and
   said intermediate segments each including a cut slit formed in said support portion for allowing said support portions of said intermediate segments to be folded and intersected and engaged with each other, and said intermediate segments each including a cut slot formed in said support portion for allowing said support portions of said intermediate segments to be folded and intersected and engaged with each other.

2. The planar member as claimed in claim 1, wherein said cut line includes an inclined upper portion for forming a latch member in said suspension hook.

3. The planar member as claimed in claim 1, wherein said side segments each include an adhesive layer attached to a back portion for adhering purposes.

4. The planar member as claimed in claim 1, wherein said intermediate segments include an inclined lower portion foldable to form a folded reinforcing member in said suspension hook for reinforcing said suspension hook.

5. The planar member as claimed in claim 1 further comprising an elongated strip for supporting said planar member.

* * * * *